United States Patent
Zad-Issa et al.

(10) Patent No.: US 7,792,281 B1
(45) Date of Patent: Sep. 7, 2010

(54) DELAY ESTIMATION AND AUDIO SIGNAL IDENTIFICATION USING PERCEPTUALLY MATCHED SPECTRAL EVOLUTION

(75) Inventors: Mohammad Reza Zad-Issa, Irvine, CA (US); Hundraj Gopal, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1302 days.

(21) Appl. No.: 11/301,898

(22) Filed: Dec. 13, 2005

(51) Int. Cl.
*H04M 9/08* (2006.01)

(52) U.S. Cl. .................................. 379/406.04

(58) Field of Classification Search ............. 379/406.04

See application file for complete search history.

(56) References Cited

U.S. PATENT DOCUMENTS

2008/0205632 A1* 8/2008 LeBlanc ................ 379/406.06

* cited by examiner

*Primary Examiner*—Alexander Jamal
(74) *Attorney, Agent, or Firm*—Farjami & Farjami LLP

(57) ABSTRACT

A signal identification method comprises receiving an incoming signal having incoming frames; receiving an outgoing signal having outgoing frames; extracting outgoing features from a current frame of the outgoing frames; extracting incoming features from a first previous frame of the incoming frames; calculating first feature distances based on corresponding outgoing features and incoming features; deriving a first score based on the first feature distances; extracting incoming features from a second previous frame of the incoming frames; calculating second feature distances based on corresponding outgoing features and incoming features from the second previous frame; deriving a second score based on the second feature distances; and determining whether the outgoing signal includes the incoming signal based on the first score and the second score.

26 Claims, 5 Drawing Sheets

DELAY ESTIMATION AND AUDIO SIGNAL IDENTIFICATION USING PERCEPTUALLY MATCHED SPECTRAL EVOLUTION

BACKGROUND OF THE INVENTION

1. Field of the Invention

The present invention relates generally to delay estimation and signal identification between audio signals. More particularly, the present invention relates to methods and systems for voice and audio quality measurement, double talk detection, signal path delay detection, signal path delay tracking, and echo cancellation, echo control or echo suppressor based on delay estimation.

2. Background Art

Subscribers use speech quality as the benchmark for assessing the overall quality of a telephone network. A key technology for providing a high quality speech is directed at elimination of the echo, using echo cancellation, echo control or echo suppression technique. Echo canceller or echo suppressor performance in a telephone network, such as a TDM or packet telephony network, has a substantial impact on the overall voice quality. An effective removal of hybrid and acoustic echo inherent in telephone networks is a key to maintaining and improving perceived voice quality during a call.

Line echoes occur in telephone networks due to impedance mismatches of network elements. Hybrid echo is the primary source of line echo generated from the public-switched telephone network (PSTN). As shown in FIG. 1, hybrid echo 110 is created by a hybrid, which connects a four-wire physical interface to a two-wire physical interface. The hybrid reflects electrical energy or audio signal back to the speaker from the four-wire physical interface.

Acoustic echo, on the other hand, is generated by analog and digital telephones or terminal audio equipment, with the degree of echo related to the type and quality of such telephones or equipment. Acoustic echoes occur in telephony terminal equipment due to electrical leakage of terminal equipment, or due to poor acoustic isolation between the microphone and speaker in handset, or due to the reflection of acoustic signal in the environment where the terminal equipment is located. As shown in FIG. 1, acoustic echo 120 is created by a voice coupling between the earpiece and microphone in the telephones, where sound from the speaker is picked by the microphone, for example, by bouncing off the walls, windows, and the like. The result of this reflection is the creation of multi-path echo, which would be heard by the speaker unless eliminated.

As shown in FIG. 1, in modern telephone networks, echo canceller 140 is typically positioned between hybrid 130 and network 150. Generally speaking, echo cancellation process involves two steps. First, as the call is set up, echo canceller 140 employs a digital adaptive filter to adapt to the far-end signal and create a model based on the far-end signal before passing through hybrid 130. After the near-end signal including the echo signal, passes through hybrid 130, echo canceller 140 subtracts the far-end model from the near-end signal to cancel hybrid echo and generate an error signal. Although this echo cancellation process removes a substantial amount of the echo, non-linear components of the echo may still remain. To cancel non-linear components of the echo, the second step of the echo cancellation process utilizes a non-linear processor (NLP) to eliminate the remaining or residual echo by attenuating the signal below the noise floor.

As shown in FIG. 1, in modern telephone networks, echo canceller 140 is typically positioned between hybrid 130 and network 150. Generally speaking, echo cancellation process involves three steps, namely, filter adaptation, non-linear processing, and double talk detection.

The echo canceller employs a digital adaptive filter to model the hybrid generating the line echo. This modeling takes place in form of gradual adaptation. The dynamics of this adaptation is controlled by the outcome of the double talk detection logic. The echo canceller adapts its filter such as to mimic the action of the hybrid on the far end signal. The echo canceller therefore regenerates the echo using its adaptive filter. This regenerated echo is subtracted from the received mixture of near end signal and echo. The output of this operation is the echo removed signal. This is also the error signal that is used to adapt the adaptive filter. The latter is adapted such that the error becomes as small as possible over time.

Although this echo cancellation process removes a substantial amount of the echo, some residual echo may still remain due to the non-linear component of the hybrid or due to error between echo canceller filter modeling the line hybrid and the actual hybrid. To cancel this residual echo, the second step of the echo cancellation process utilizes a non-linear processor (NLP) to eliminate the remaining or residual echo by attenuating the signal below the noise floor. The NLP logic is applied to the echo removed signal in absence of double talk.

An echo suppressor operate in a similar fashion as an echo canceller, except that echo suppressor and echo controller do not utilize an adaptive filter. Rather, they only utilize the NLP for echo removal. The terms echo suppression, echo control and echo reduction may be used interchangeably in the art.

Echo Cancellers employ different techniques to cover a tail length. The term tail length refers to time window within which the echo of a signal on the outgoing port may come back on the incoming input port. The tail length determines the length and the nature of the adaptive filters that may be used in echo cancellers. One example technique to cover the tail length uses a SPARSE filter.

SPARSE echo cancellers employ adaptive filter algorithms with a dynamically positioned window to cover a desired echo tail length, such as a sliding window, e.g. a 24 ms window, covering an echo path delay, e.g. a 128 ms delay. To properly cancel the echo, the echo canceller must determine the delay, which is indicative of the location of the echo signal segment or window within the 128 ms echo path delay. If the delay is not determined accurately, not only the echo signal is not properly cancelled, but also the echo canceller further distorts the signal by performing the echo cancellation at a wrong place. Therefore, it is crucial that the delay is determined accurately.

Another technique used by echo cancellers for covering the tail length is also known as selective update. In this approach, different segments of the filter, which model the echo generation process, are adapted differently. In this scenario, the knowledge of the delay can guide the echo cancellers (full or sparse) to accurately select the taps (or filter coefficients) that require special attention or some selective update scheme.

As discussed above, the role of a double talk detector is of prime importance in the operations of an echo canceller. Because the line echo canceller is utilized to cancel an echo of Rin' signal 141 from Sin signal 132, presence of speech signal from the near end would cause the adaptive filter to converge on a combination of near end speech signal and Rin' signal 141, which will lead to an inaccurate echo path model, i.e. incorrect adaptive filter coefficients. Therefore, in order to cancel the echo signal, the adaptive filter should not train or update the filter in the presence of the near end speech signal. To this end, conventional echo cancellers analyze Sin signal 132 and determine whether it contains the speech of a near end talker. By convention, if two people are talking over a communication network or system, one person is referred to as the "near talker," while the other person is referred to as the "far talker." The combination of speech signals from the near end talker and the far end talker is referred to as "double talk." To determine whether Sin signal 132 contains double talk, a double talk detector estimates and compares the characteristics of Rin' signal 141 and Sin signal 132. An estimate of the delay is among most important information that a double talk detector can use for accurate functioning. A purpose of the double talk detector is to prevent the adaptive filter from adapting when double talk is detected and to deactivate the operation of NLP in presence of the near end speaker.

If the double talk detector does not accurately determine the existence of a double talk condition, the adaptive filter improperly trains on a signal that includes a near end signal, and the adaptive will not accurately model the echo signal. Conversely, if the double talk detector does not accurately determine non-existence of a double talk condition, the adaptive filter does not train on Rin' signal 141 and the adaptive will not accurately model the echo signal.

Furthermore, typically, handset or telephone equipment includes an acoustic echo canceller to cancel acoustic echo 120. However, to further control, eliminate or suppress acoustic echo, acoustic echo controller 145 may be used at central office or base station. For example, acoustic echo controller 145 is utilized to suppress the acoustic echo that is generated by the far end handset. To this end, acoustic echo controller 145 estimates the delay and suppresses acoustic echo of Sout signal 142 from Rin signal 146 received from the far end (not shown). As stated above, it is crucial that the delay is determined accurately. In fact, conventional systems determine the delay for the acoustic echo even less accurately than for the line echo due to presence of greater number of non-linear components in the acoustic echo path.

Today, there are a number of approaches to delay estimation and double talk detection. For example, one conventional approach utilizes an energy-based method, which is based on the assumption that ERL (echo return loss) is bounded, and the energy of the outgoing and incoming signals are computed and kept in a history buffer. When the incoming signal energy is below the ERL, the signal has the potential of being an echo. Some techniques immediately declare this signal as an echo, but others perform further analysis, such as averaging, and the like. Once a signal is declared as an echo, the echo canceller filter adaptation logic is activated. Although such energy-based techniques are simple and less complex, they are prone to errors at the onset and offset of speech bursts or when a large dynamic rage exists between the two talkers.

Another conventional method is correlation-based, where ones measures the cross correlation of time samples (full band or sub-band) between the outgoing and incoming signal. Although such methods are more reliable that energy-based methods when echo and distortions are linear, the correlation-based methods suffer from being computationally expensive and requiring a large memory for the retention of a sample history of the outgoing signal for the maximum possible delay length.

A further conventional approach is a statistical-based method, where one measures the cross correlation of time samples (full band or sub-band) between the outgoing and incoming signal. Like the previous approach, the statistical-based method offers reliability when echo and distortions are linear; however, it suffers from the same problems as the correlation-based method, described above.

Some conventional systems may utilize a closed-loop method, where the information provided by the adaptive filter is used to estimate the delay. In other words, if there exists a double talk detector (as described above) at the front end, it is possible for the adaptive filter to reach a level of convergence, where the shape of the adaptive filter, i.e. the location of dominant peaks is an indication of the delay(s). Such estimated delay information is in turn used by the double talk detector logic to improve the ERL estimate. This approach has several drawbacks, including the requirements of using an adaptive filter and a large buffer for retaining the sample history of the outgoing signal for the maximum possible delay length.

Further, the aforementioned conventional techniques are based on an assumption of linearity of echo generation process or a linear relation between the original signal and its echo. These conventional techniques of delay estimation fail or produce inaccurate results when the level of non-linear components in the network increases (e.g. non linear processing of signals via voice compression, none linear gains of amplifiers in terminal audio equipment, and the like.)

Accordingly, conventional methods for estimating the delay and detecting the double talk condition suffer from many disadvantages, and there is a need in the art for methods and systems to more accurate estimate the delay and/or detect the double talk condition.

SUMMARY OF THE INVENTION

The present invention is directed to methods and systems for voice and audio quality measurement, double talk detection, signal path delay detection, signal path delay tracking, and echo cancellation, echo control or echo suppressor based on delay estimation. In one aspect, there is provided a signal identification method. The method comprises receiving an incoming signal divided into a plurality of incoming frames; receiving an outgoing signal divided into a plurality of outgoing frames; extracting one or more outgoing features from a current frame of the plurality of outgoing frames; extracting one or more incoming features from a first previous frame of the plurality of incoming frames; calculating one or more first feature distances based on corresponding the one or more outgoing features from the current frame and the one or more incoming features from the first previous frame; deriving a first score based on the one or more first feature distances; extracting one or more incoming features from a second previous frame of the plurality of incoming frames; calculating one or more second feature distances based on corresponding the one or more outgoing features from the current frame and the one or more incoming features from the second previous frame; deriving a second score based on the one or more second feature distances; and determining whether the outgoing signal includes the incoming signal based on the first score and the second score.

In a further aspect, the method also comprises weighting the one or more first feature distances to generate one or more first weighted distances, prior to the deriving the first score, and wherein the deriving the first score derives the first score based on the one or more first weighted distances; and weighting the one or more second feature distances to generate one or more second weighted distances, prior to the deriving the second score, and wherein the deriving the second score derives the second score based on the one or more second weighted distances. In an additional aspect, the weighting of the one or more first feature distances is applied based on a classification of the current frame of the plurality of outgoing frames.

In one aspect, the one or more incoming features may include excitation patterns, dominant peaks and spectral components, wherein the evolution of excitation patterns and the spectral components are measured with respect to a short-term average spectrum. The one or more incoming features may further include one or more of evolution of excitation patterns, dominant peaks and spectral components.

In another aspect, the method determines whether the outgoing signal includes an echo of the incoming signal, and calculates an echo delay, based on the first score and the second score, for canceling the echo of the incoming signal in the outgoing signal or suppressing the echo of the incoming signal in the outgoing signal. The echo delay may also be used for a double talk detection and a change of echo path detection.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
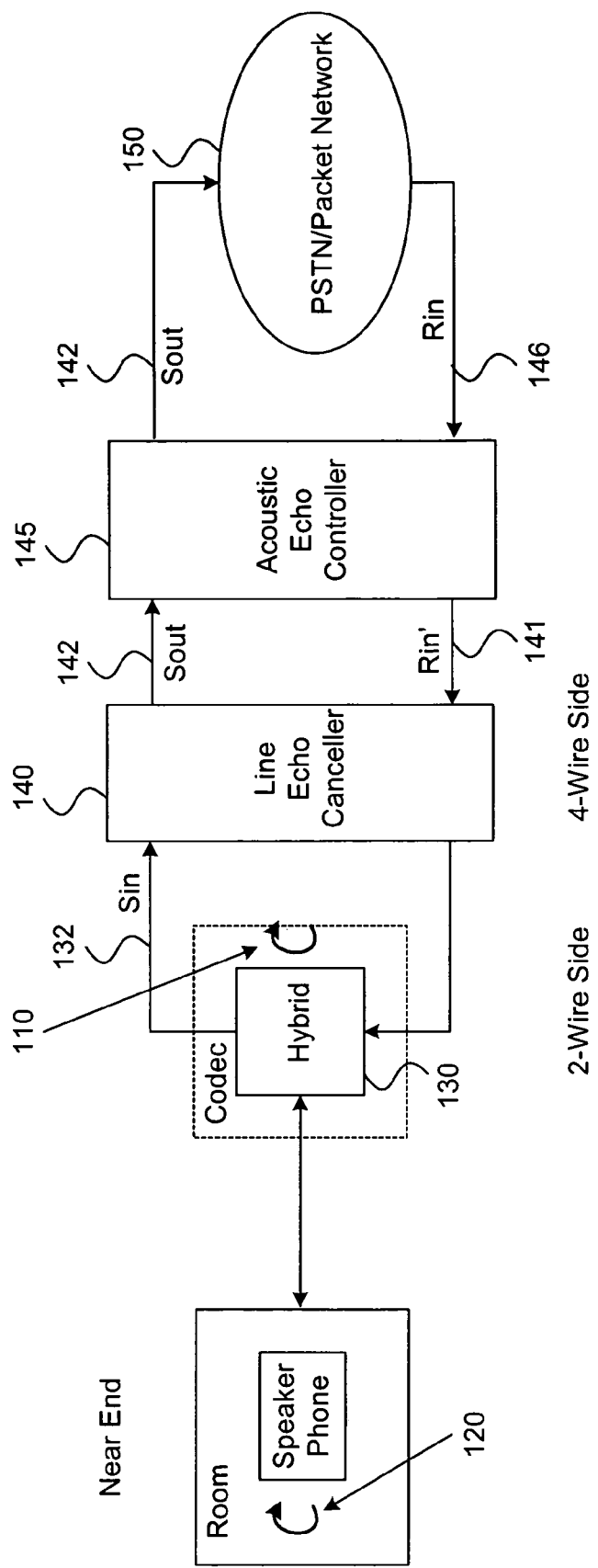
FIG. 1 illustrates a block diagram of a conventional communication system showing a placement of an echo canceller and an acoustic echo controller in an access network.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
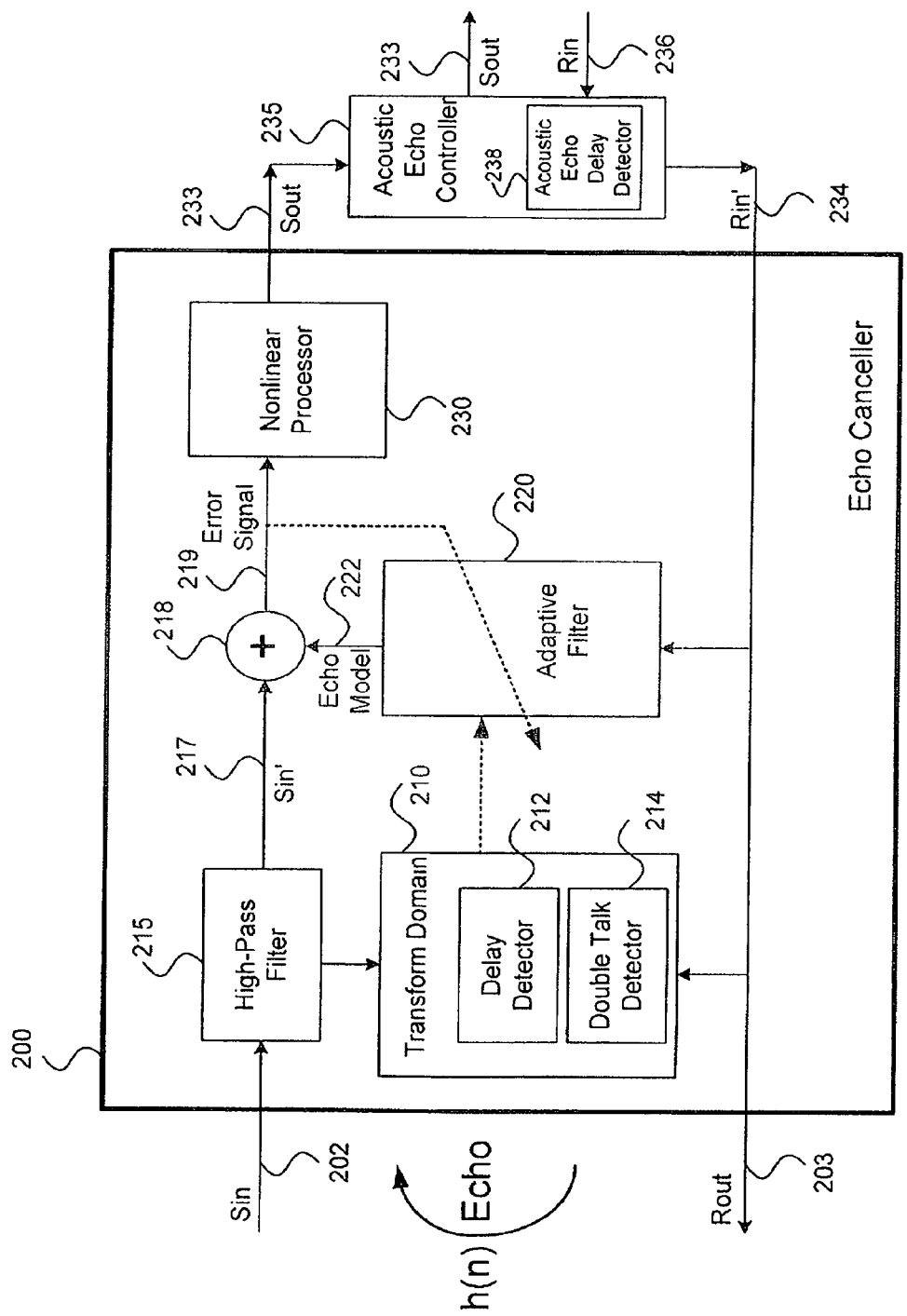
FIG. 2 illustrates a block diagram of a conventional system having an echo canceller and an acoustic echo controller, for implementation of one embodiment of the present invention.

FIG. 2 illustrates a block diagram of a conventional system having echo canceller 200 and acoustic echo controller 235, for implementation of one embodiment of the present invention. As shown, echo canceller 200 includes delay detector 212 and double talk detector 214 in transform domain module 210, high-pass filter 215, adaptive filter 220 and nonlinear processor 230. During its operation, echo canceller 200 receives Rin' signal 234 from acoustic echo controller 235 (or the far end if no acoustic echo controller exists), which is fed to adaptive filter 220, and delay detector 212 and double talk detector 214 in transform domain module 210 (e.g. Discrete Fourier Transform, Discrete Cosine Transform, Sub-hand, and Wavelet, etc.), and is passed through to the hybrid, e.g. see hybrid 130 of FIG. 1, as Rout signal 204 to the near end. As discussed above, the hybrid causes Rout signal 204 to be reflected as Sin signal 202 from the near end, which is fed to echo canceller 200.

High-pass filter 215, which is placed at the near-end side of echo canceller 200, removes DC component from Sin signal. 202 and generates Sin' signal 217. Double talk detector 214 controls the behavior of adaptive filter 220 during periods when Sin signal 202 from the near end reaches a certain level. Because echo canceller 200 is utilized to cancel an echo of Rin' signal 234, presence of speech signal from the near end would cause adaptive filter 220 to converge on a combination of near end speech signal and Rin' signal 234, which will lead to an inaccurate echo path model, i.e. incorrect adaptive filter 220 coefficients. Therefore, in order to cancel the echo signal, adaptive filter 220 should not train in the presence of the near end speech signal. To this end, double talk detector 214 analyzes the incoming signal and determine whether it is solely an echo signal of Rin' signal 234 or also contains the speech of a near end talker to prevent adaptive filter 220 from adaptation when double talk is detected or to adjust the degree of adaptation based on confidence level of double talk detection.

Echo canceller 200 utilizes adaptive filter 220 to model the echo path and its delay. In one embodiment, adaptive filter 220 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve performance of echo canceller 200, it may be desirable to vary the adaptation rate at which the transversal filter tap coefficients of adaptive filter 220 are adjusted. For instance, if double talk detector 214 denotes a high confidence level that the incoming signal is an echo signal, it is preferable for adaptive filter 220 to adapt quickly. On the other hand, if double talk detector 214 denotes a low confidence level that the incoming signal is an echo signal, i.e. it may include double talk, it is preferable to decline to adapt at all or to adapt very slowly. If there is an error in determining whether Sin signal 202 is an echo signal, a fast adaptation of adaptive filter 220 causes rapid divergence and a failure to eliminate the echo signal.

Adaptive filter 220 may be represented by function h(n), which is originally reset, i.e. h(n)=0. As Rin' signal 234 is received by adaptive filter 220, function h(n) grows to form an echo path model based on Rin' signal 234 from the far end. In one embodiment, echo canceller 200 can be a SPARSE echo canceller, which employs adaptive filter algorithms with a dynamically positioned window to cover a desired echo tail length. In such embodiment, delay detector 212 uses a sliding window, e.g. a 24 ms window, covering an echo path delay, e.g. a 128 ms delay. To properly cancel the echo, delay detector 212 must determine delay, which is indicative of the location of the echo signal segment or window within the 128 ms echo path delay. Delay detector 212 further tracks the delay and updates the delay for proper echo cancellation or suppression.

As shown in FIG. 2, adaptive filter 220 produces echo model signal 222 based on Rin' signal 234 from the far end.

Error estimator 218 receives Sin' signal 217, which is the output of high-pass filter 215, and subtracts echo model signal 222 from Sin' signal 217 to generate residual echo signal or error signal 219. Adaptive filter 220 also receives error signal 219 and updates its coefficients based on error signal 219.

It is known that the echo path includes nonlinear components that cannot be removed by adaptive filter 220 and, thus, after subtraction of echo model signal 222 from Sin' signal 217, there remains residual echo, which must be eliminated by nonlinear processor (NLP) 230. As shown NLP 230 receives residual echo signal or error signal 219 from error estimator 218 and generates Sout 233 for transmission to far end. If error signal 219 is below a certain level, NLP 230 replaces the residual echo with either comfort noise if the comfort noise option is enabled, or with silence if the comfort noise option is disabled.

Turning to acoustic echo controller 235 of FIG. 2, it receives Rin signal 236 from the far end, which may include an acoustic echo of Sout signal 233. As explained above, such acoustic echo may be caused by the telephone handset at the far end. For example, Sout signal 233, which is received by the far end handset that uses a speaker. The sound from the speaker may be picked up by the microphone directly due to a poor coupling or indirectly from bouncing off the windows, walls, ceiling, and the like. Although the acoustic echo should preferably be cancelled by the handsets, some handsets do not support such feature or perform a poor acoustic echo cancellation. Acoustic echo controller 235 is placed in the access network to suppress the acoustic echo from the far end by locating the echo of Sout signal 233 in Rin signal 236. Acoustic echo delay detector 238 determines the location of the acoustic echo of Sout signal 233 in Rin signal 236 by estimating the acoustic echo delay time that it takes for the echo of Sout signal 233 to appear in Rin signal 236.

Below, in conjunction with FIG. 3, the present application describes an echo delay estimation method 300 for estimating the delay for line echo cancellation and estimating the acoustic echo delay time for suppressing the acoustic echo suppression, according to one embodiment of the present invention. It should be noted that echo delay estimation method 300 for voice quality measurements and other applications that may benefit from comparing and analyzing voice signals. Furthermore, in some embodiments, the received signal may not be an echo, and rather than echo delay, the estimation method may determine the time for realization of a reference signal, and the delay estimation may apply when the received signal is any of the following: (1) a delayed but identical version of the reference signal, (2) a delayed and modified version of the reference signal, (3) acoustic echo of the reference signal, (4) line echo of a reference signal, (5) packet network echo of a reference signal, and (6) a delayed version of the reference signal mixed with noise or a second talker. Therefore, the term echo delay is utilized with respect to one embodiment of the present application, and the term echo delay may be replaced with estimated delay or time difference in other embodiments of the present application.

Figures 1, 3:
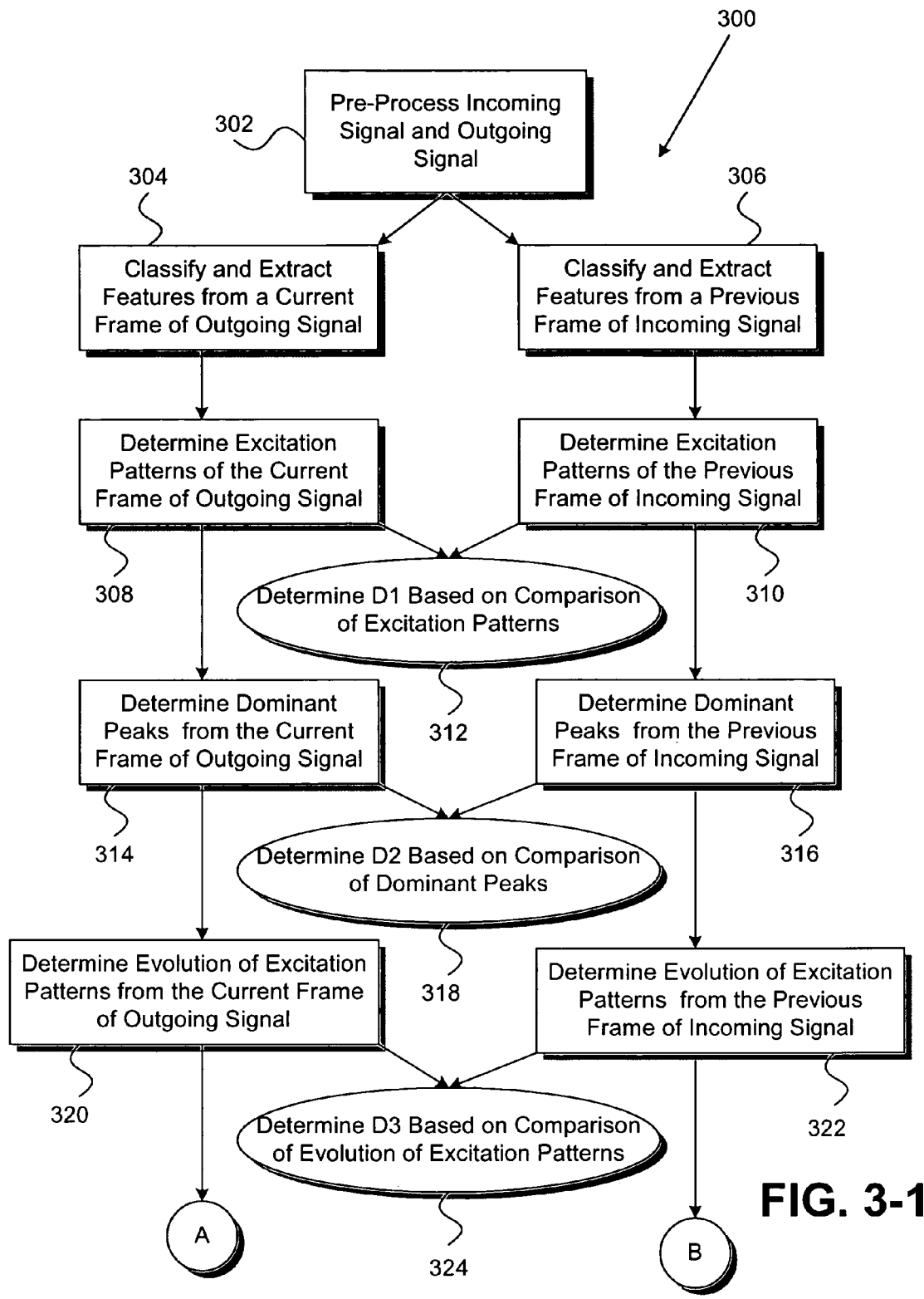
FIG. 3 illustrates a flow diagram for use in conjunction with the echo canceller and the acoustic echo controller of FIG. 2 to estimate delay, and to detect a double talk condition and an echo path change, according to one embodiment of the present invention.
Figures 2, 3:
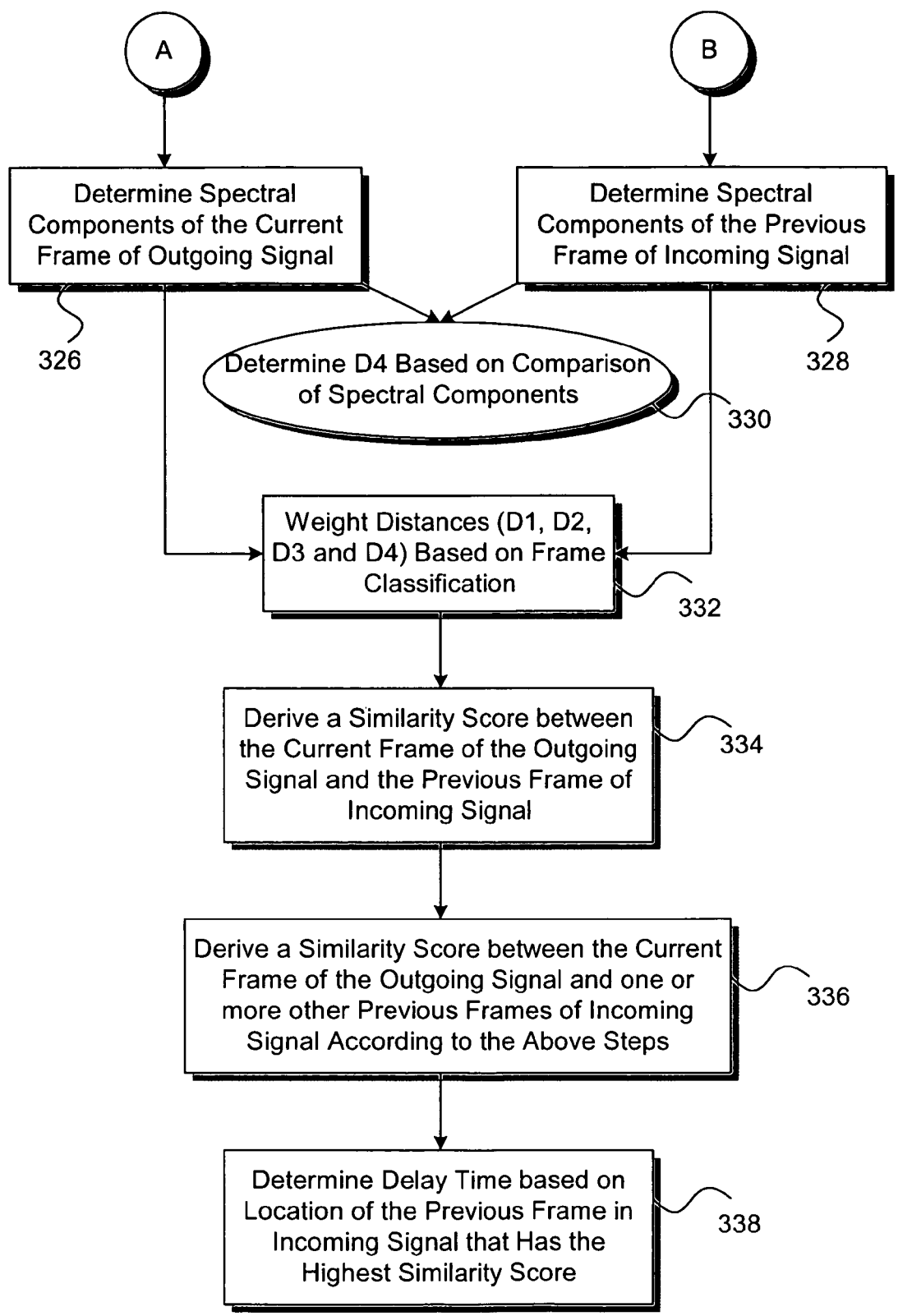

Turning to FIG. 3, echo delay estimation method 300 begins at step 302, where an incoming signal and an outgoing signal are received and processed. With reference to FIG. 2, for example, delay detector 212 receives Sin signal 202 (the outgoing signal) and Rin' signal 234 (the incoming signal) to detect the delay, which is indicative of the location of an echo of Rin' signal 234 in Sin signal 202 reflected by the hybrid. With further reference to FIG. 2, for example, acoustic echo delay detector 212 receives Rin signal 236 (the outgoing signal) and Sout signal 233 (the incoming signal) to detect the acoustic echo delay, which is indicative of the location of an echo of Sout signal 233 in Rin signal 236 reflected by the far end handset. In other words, the outgoing signal includes an echo of the incoming signal, which can be cancelled by echo canceller 200 or suppressed by acoustic echo controller 235. Echo canceller 200 cancels echo of Rout signal 203 that may exist in Sin' signal 217 due to the hybrid, and generates error signal 219, which is an echo removed version of Sin' signal 217. Acoustic echo controller 235, however, suppresses the echo of Sout signal 233 that may exist in Rin signal 236 due to an acoustic coupling at a terminal, and generates Rin' signal 234, which is an echo-removed version of Rin signal 236.

At step 302, pre-processing of the incoming and outgoing signals may include accumulating digitized data signals in incoming and outgoing buffer, and obtaining speech coding parameters, such as linear prediction coding (LPC) parameters, voice activity detection (VAD) information, noise parameters, and the like, from the speech coder. Further, the incoming and outgoing signals may be transformed from time to another domain, such as frequency domain by using a discrete Fourier transform. The transformed outgoing digitized data signal is divided into one or more frames and stored in an outgoing pre-processed buffer. Similarly, the transformed incoming digitized data signal is divided into one or more frames and stored in an incoming pre-processed buffer.

Next, at step 304, a current frame in the outgoing pre-processed buffer is classified and one or more parameters are extracted from the current frame, as described in steps 308, 314, 320 and 326. Further, at step 306, a previous frame in the incoming pre-processed buffer is classified and one or more parameters are extracted from the previous frame, as described in steps 310, 316, 322 and 328. The terms "current" and "previous" are used merely to indicate that the echo of the incoming signal lags in time with respect the incoming signal, as received by delay detector 212 or acoustic echo delay detector 238.

At step 308, echo delay estimation method 300 determines or extracts excitation patterns from the current frame of the outgoing signal, which are indicative of energy in critical bands. Similarly, at step 310, echo delay estimation method 300 determines or extracts excitation patterns from the previous frame of the incoming signal, and subjects the excitation patterns from the previous frame to the model of echo path, from adaptive filter 220, in the excitation pattern domain to obtain modified excitation patterns for the previous frame of the incoming signal. Subjecting the excitation patterns from the previous frame to the model of echo path can be applying ERL transformation to the excitation patterns. Next, at step 312, a distance between the excitation patterns from the current frame of the outgoing signal and the modified excitation patterns from the previous frame of the incoming signal is calculated, which is designated by D1.

Excitation pattern refers to a model of a sound (or a mixture of sounds, such as speech, audio, music or noise) as perceived by a human ear. In its most generic form, the excitation pattern is computed by decomposing the audio signal using a set of filter banks. Sometimes, these filter banks are based on the critical bands (in reference to the operation of hair cells and neurons in the inner ear). In practice, the power of the signal in each band is computed, and then the masking phenomena is determined in frequency (or time domain), where one sound can impair the perception of a neighboring sound. Among other factors that may be used in the excitation pattern modeling are ear internal noise, outer ear modeling as a filter, etc.

At step 314, echo delay estimation method 300 determines or extracts dominant peaks in the transformed domain (or dominant peaks for short) of the current frame of the outgoing signal, such as three (3) dominant peaks. Similarly, at step 316, echo delay estimation method 300 determines or extracts dominant peaks of the previous frame of the incoming signal, such as three (3) dominant peaks. Next, at step 318, a distance between the dominant peaks of the current frame of the outgoing signal and the dominant peaks of the previous frame of the incoming signal is calculated, which is designated by D2.

At step 320, echo delay estimation method 300 determines or extracts evolution of the excitation patterns of the current frame of the outgoing signal with respect to short-term average spectrum. Similarly, at step 322, echo delay estimation method 300 determines or extracts evolution of the excitation patterns of the previous frame of the incoming signal with respect to short-term average spectrum. Next, at step 324, a distance between the evolution of the excitation patterns of the current frame of the outgoing signal and the evolution of the excitation patterns of the previous frame of the incoming signal is calculated, which is designated by D3. Similarly, at step 324, D3 may be calculated to determine the evolution of other features, such as the evolution of the dominant peaks, spectral components, or any combination thereof.

At step 326, echo delay estimation method 300 determines or extracts spectral components of the current frame of the outgoing signal that vary most with respect to short-term average spectrum. Similarly, at step 328, echo delay estimation method 300 determines or extracts spectral components of the previous frame of the incoming signal that vary most with respect to short-term average spectrum. Next, at step 330, a distance between the spectral components of the current frame of the outgoing signal and the spectral components of the previous frame of the incoming signal is calculated, which is designated by D4. Next, at step 332, one or more distances (D1, D2, D3 and D4), that have been calculated, are weighted based on the classification of frames to generate one or more weighted distances. For example, for D2, assuming the outgoing signal includes M dominants peaks, NE[k].f1, NE[k].f2, NE[k].fM, and the incoming signal includes M dominants peaks, FE[k].f1, FE[k].f2, FE[k].fM, then the distance D2 may be calculated based on ABS(NE[k]JN−FE[k].fN) for N=1 to M. To obtain the weighted value of D2, ABS(NE[k].fN−FE[k].fN) is multiplied by WEIGHT[N]. The weight may be derived based on a variety factors, such as a function of the different between the values of spectral components for the two sets of dominant peaks, i.e. ABS(NE[k].fN−FE[k].fN)*FCT(NE[k].TDC(fN)−FE[k].TDC(fN)).

At step 334, echo delay estimation method 300 derives a similarity score between the current frame of the outgoing signal and the previous frame of the incoming signal based on one or more weighted distances calculated in step 332. Next, at step 336, the steps of 306, 310, 312, 316, 318, 322, 328, 330, 332 and 334 are repeated for one or more previous frames of the incoming signal, which generate one or more similarity scores between the current frame of the outgoing signal and the additional previous frames of the incoming signal. At step 338, the two or more similarity scores are compared to determine which of the previous frames of the incoming signal is the highest, which is indicative of the most similarity between such previous frame of the incoming signal and the current frame of the outgoing signal. Next, the location of such previous frame of the incoming signal with respect to the current frame of the incoming signal is indicative of the amount of delay.

Furthermore, echo delay estimation method 300 may also track the amount of delay and if the amount of delay changes by more than a pre-determined threshold, an echo path change can be triggered, which may initialize the echo canceller. In addition, if the similarity scores are less than other pre-determined threshold(s), a double talk detection may be indicated.

As mentioned above, in addition to delay estimation and tracking, the invention of present application may also be utilized for signal identification. Delay estimation and tracking may be used for voice quality monitoring, echo suppressors and cancellation round trip delay detection and tracking, sparse design or selective update of echo cancellers, and both echo cancellers and echo suppressors for the purpose of double talk detection and NLP. With respect to signal identification, there may exist data from two different points in the network, e.g. audio input A, and audio input B, where audio input B is composed of audio input A (which is not necessarily an echo of audio input A) and other audio signals (e.g., three way conferencing, etc). In such event, the present invention may be utilized in assessing the delay between input audio input A and the realization of audio input A in audio input B. Further, in some embodiments, the present invention may want to not only estimate the delay, but also mark parts of audio input B that corresponds to audio input A. Further, when the present invention is utilized for echo identification, the advantages may include controlling double talk detector and NLP for echo cancellers and echo suppressors, and adaptation rate control, sparse and selective update for echo cancellers.

Figure 4:
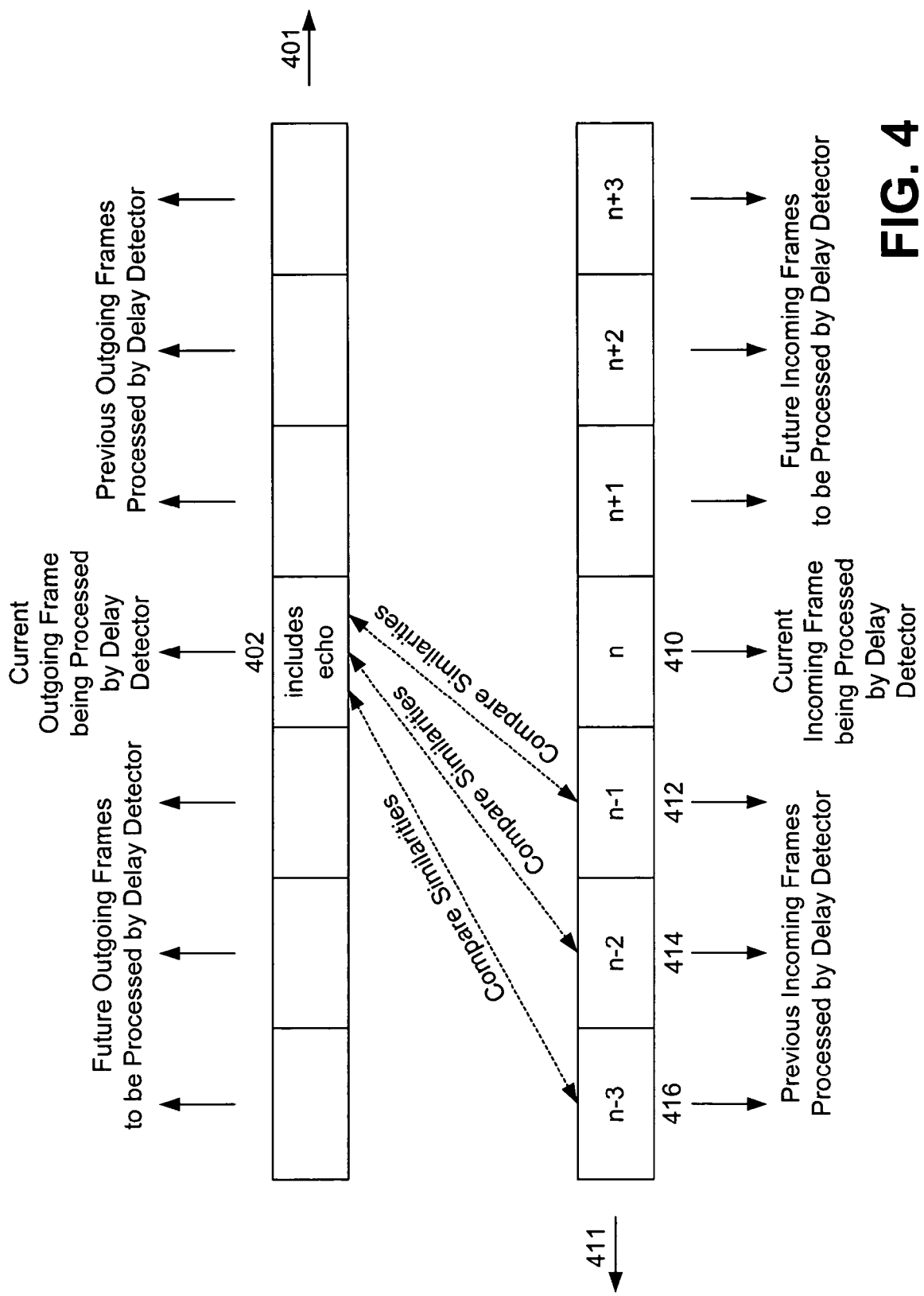
FIG. 4 illustrates a signal processing diagram that shows the application of the flow diagram of FIG. 3 to the frames of the incoming and outgoing signals.

FIG. 4 of the present application illustrates the application of echo delay estimation method 300 to outgoing signal 401 and incoming signal 411, according to one embodiment of the present invention. As shown in FIG. 4, features of current frame 402 of outgoing signal 401 are compared with features of previous frames 412, 414 and 416 of incoming signal 411 to determine which of previous frames 412, 414 and 416 of incoming signal 411 has features that are more similar to those of current frame 402 of outgoing signal 401. For example, if previous frame 416 of incoming signal 411 has the highest similarity with current frame 402 of outgoing signal 401, the echo delay is estimated based on the time difference between previous frame 416 of incoming signal 411 and current frame 410 of incoming signal 411.

Accordingly, the present application has described a novel technique for delay estimation that relies on matching the perceptually relevant characteristics of the outgoing and incoming signals. The novel technique of the present application is based on a realization that there are distinct perceptual features in the incoming signal that can be detected in its echo, as present in the outgoing signal. In one embodiment, the features capture the speech characteristics as well as the nature of the speech uttered, where some features capture instantaneous characteristics of the speech, while others may track the temporal evolution of some speech parameters. The present invention offers many advantages over the conventional approaches. For example, the present invention performs well in view of non-linear components in the voice signal path and long delays. It further offers low complexity, low memory usage and scalability.

Further, although the present application refers to acoustic echo control or echo suppression, the present invention may be applied to all forms of echo, such as hybrid echo, acoustic echo, and packet network equipment echo.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A signal identification method comprising:
   receiving an incoming signal divided into a plurality of incoming frames;
   receiving an outgoing signal divided into a plurality of outgoing frames;
   extracting outgoing features from a current frame of the plurality of outgoing frames;
   extracting incoming features from a first previous frame of the plurality of incoming frames;
   calculating first feature distances based on corresponding the outgoing features from the current frame and the incoming features from the first previous frame;
   deriving a first similarity score based on the first feature distances;
   extracting incoming features from a second previous frame of the plurality of incoming frames;
   calculating second feature distances based on corresponding the outgoing features from the current frame and the incoming features from the second previous frame;
   deriving a second similarity score based on the second feature distances; and
   determining whether the incoming signal includes an echo of the outgoing signal based on the first similarity score and the second similarity score.

2. The method of claim 1 further comprising:
   weighting the first feature distances to generate first weighted distances, prior to the deriving the first similarity score, and wherein the deriving the first similarity score derives the first similarity score based on the first weighted distances; and
   weighting the second feature distances to generate second weighted distances, prior to the deriving the second similarity score, and wherein the deriving the second similarity score derives the second similarity score based on the second weighted distances.

3. The method of claim 2, wherein the weighting the first feature distances are applied based on a classification of the current frame of the plurality of outgoing frames.

4. The method of claim 1, wherein the incoming features include excitation patterns.

5. The method of claim 1, wherein the incoming features include dominant peaks.

6. The method of claim 1, wherein the incoming features include of temporal evolution of excitation patterns, dominant peaks and spectral components.

7. The method of claim 1, wherein the incoming features include spectral components.

8. The method of claim 1, wherein the incoming features includes excitation patterns, dominant peaks, temporal evolution of excitation patterns and spectral components.

9. The method of claim 1, wherein the temporal evolution of excitation patterns and the spectral components are measured with respect to a short-term average spectrum.

10. The method of claim 1, wherein the determining determines whether the outgoing signal includes an echo of the incoming signal, and wherein the method further comprising: calculating an echo delay, based on the first similarity score and the second similarity score, for canceling the echo of the incoming signal in the outgoing signal.

11. The method of claim 1, wherein the determining determines whether the outgoing signal includes an echo of the incoming signal, and wherein the method further comprising: calculating an echo delay, based on the first similarity score and the second similarity score, for suppressing the echo of the incoming signal in the outgoing signal.

12. The method of claim 1, wherein the determining determines whether the outgoing signal includes an echo of the incoming signal, and wherein the method further comprising: calculating an echo delay, based on the first similarity score and the second similarity score.

13. The method of claim 1, wherein the determining determines whether the outgoing signal includes an echo of the incoming signal, and wherein the method further comprising: calculating an echo delay, based on the first similarity score and the second similarity score, for a change of echo path detection.

14. An signal identifier comprising:
   an incoming signal receiver configured to receive an incoming signal divided into a plurality of incoming frames;
   an outgoing signal receiver configured to receive an outgoing signal divided into a plurality of outgoing frames;
   a feature extractor configured to extract outgoing features from a current frame of the plurality of outgoing frames, and further configured to extract incoming features from a first previous frame of the plurality of incoming frames;
   a distance calculator configured to calculate first feature distances based on corresponding the outgoing features from the current frame and the incoming features from the first previous frame, wherein the signal identifier is configured to derive a first similarity score based on the first feature distances;
   the feature extractor further configured to extract incoming features from a second previous frame of the plurality of incoming frames;
   the distance calculator further configured to calculate second feature distances based on corresponding the outgoing features from the current frame and the incoming features from the second previous frame, wherein the signal identifier is configured to derive a second similarity score based on the second feature distances;
   wherein the signal identifier is configured to determine whether the incoming signal includes an echo of the outgoing signal based on the first similarity score and the second similarity score.

15. The signal identifier of claim 14 further comprising:
   a weighting module configured to weight the first feature distances to generate first weighted distances, prior to the deriving the first similarity score, and wherein the signal identifier is configured to derive the first similarity score based on the first weighted distances; and
   the weighting module configured to weight the one second feature distances to generate second weighted distances, prior to the deriving the second similarity score, and wherein the signal identifier is configured to derive the second similarity score based on the second weighted distances.

16. The signal identifier of claim 15, wherein weighting of the first feature distances are applied based on a classification of the current frame of the plurality of outgoing frames.

17. The signal identifier of claim 14, wherein the incoming features include excitation patterns.

18. The signal identifier of claim 14, wherein the incoming features include dominant peaks.

19. The signal identifier of claim 14, wherein the incoming features includes temporal evolution of excitation patterns, dominant peaks and spectral components.

20. The signal identifier of claim 14, wherein the incoming features include spectral components.

21. The signal identifier of claim 14, wherein the incoming features include excitation patterns, dominant peaks, temporal evolution of excitation patterns and spectral components.

22. The signal identifier of claim 14, wherein the temporal evolution of excitation patterns and the spectral components are measured with respect to a short-term average spectrum.

23. The signal identifier of claim 14, wherein the signal identifier determines whether the outgoing signal includes an echo of the incoming signal, and further calculates an echo delay, based on the first similarity score and the second similarity score, for canceling the echo of the incoming signal in the outgoing signal.

24. The signal identifier of claim 14, wherein the signal identifier determines whether the outgoing signal includes an echo of the incoming signal, and further calculates an echo delay, based on the first similarity score and the second similarity score, for suppressing the echo of the incoming signal in the outgoing signal.

25. The signal identifier of claim 14, wherein the signal identifier determines whether the outgoing signal includes an echo of the incoming signal, and further calculates an echo delay, based on the first similarity score and the second similarity score.

26. The signal identifier of claim 14, wherein the signal identifier determines whether the outgoing signal includes an echo of the incoming signal, and further calculates an echo delay, based on the first similarity score and the second similarity score, for a change of echo path detection.

* * * * *